(12) United States Patent
Lu et al.

(10) Patent No.: US 7,434,499 B2
(45) Date of Patent: Oct. 14, 2008

(54) FIXING MECHANISM OF A LATHE

(75) Inventors: Yung-Hsiang Lu, Chiayi (TW); Chung-Lung Lin, Jhongpu Township, Chiayi County (TW)

(73) Assignee: Factory Automation Technology Co., Ltd., Chiayi (TW)

( * ) Notice: Subject to any disclaimer, the term of this patent is extended or adjusted under 35 U.S.C. 154(b) by 323 days.

(21) Appl. No.: 11/449,709

(22) Filed: Jun. 9, 2006

(65) Prior Publication Data

US 2007/0283793 A1    Dec. 13, 2007

(51) Int. Cl.
*B23B 7/06* (2006.01)
*B23B 1/00* (2006.01)

(52) U.S. Cl. .............................. 82/117; 82/124; 82/149

(58) Field of Classification Search .................. 82/117, 82/124–127, 129, 101, 149; 29/27 C, 27 R, 29/563

See application file for complete search history.

(56) References Cited

U.S. PATENT DOCUMENTS 5,083,485 A * 1/1992 Link et al. .................... 82/124
6,257,108 B1 * 7/2001 Otake ........................ 82/1.11
7,062,999 B2 * 6/2006 Hayashi et al. .............. 82/122

* cited by examiner

Primary Examiner—Willmon Fridie
(74) Attorney, Agent, or Firm—Rosenberg, Klein & Lee

(57) ABSTRACT

A lathe includes a stock, a shaft, a power source, gripping bars, and a platform; the stock has a shaft seat secured therein, which has a hollow holding portion, and an inner protrusion; the shaft is passed in the shaft seat in a movable manner, and has a head having a step-shaped portion and projecting into the holding space; the power source is used for actuating the shaft; the gripping bars are spaced around the shaft head, and each have inner and outer recesses; the platform has a hollow portion, and an inner protrusion right above and facing the inner protrusion of the shaft seat; when the shaft is moved upwards, the step-shaped portion will be pressed against upper edges of the inner recesses to raise the gripping bars; thus, both the protrusions are tightly held within the outer recesses of the gripping bars, and the working platform secured in position.

8 Claims, 6 Drawing Sheets

FIXING MECHANISM OF A LATHE

BACKGROUND OF THE INVENTION

1. Field of the Invention

The present invention relates to a fixing mechanism of a lathe, more particularly one, which includes several gripping bars hiding therein instead of sticking out such that switching action of the working platforms can't be interfered with, and the fixing mechanism will move a shorter distance in securing/releasing the working platforms, thus increasing efficiency of the lathe and the safety of operation.

2. Brief Description of the Prior Art

Lathes are important machining apparatuses, and they are grouped into horizontal lathes and vertical ones, which are different in the position of the cutting tools. Referring to FIG. 1, a currently existing vertical lathe 9 includes a supporting frame 91, cutting tools 92, two door planks 93, a rotating disk 94, and two working platforms 95. The cutting tools 92 are positioned in a holding space of the supporting frame 91. The door planks 93 are pivoted to the supporting frame 91 for closing the holding space. Workpieces (not shown) are fixed on respective ones of the working platforms 95. The working platforms 95 are moved into the holding space of the supporting platform 91 in sequence by means of the rotating disk 94 such that the workpieces are machined by means of the cutting tools 92; before each cutting process is started, the door planks 94 will be closed to prevent cutting oil and iron bits from getting out of the holding space to dirty the environment and hurt the workers.

The working platforms 95 have to be firmly fixed to the supporting frame 91 by means of a fixing mechanism as soon as they are moved into the holding space for allowing the workpieces to be machined. A kind of currently existing fixing mechanism for the working platforms 95 is actuated to fix/release the working platforms 95 by means of an oil hydraulic device with springs. And, such fixing mechanisms are usually equipped with gripping claws for releaseably gripping the working platform of a lathe.

The above-mentioned structure has the following disadvantages:

2. The fixing mechanism sticks out for a certain distance: to release a working platform, the gripping claw of the fixing mechanism will have to stick out from the joint between the fixing mechanism and the working platform. Therefore, the gripping claw has to move upwards for a longer distance for allowing the switching action of the working platforms, increasing the length of time spent in switching the working platforms, and reducing efficiency of the lathe. Furthermore, the gripping claw could interfere with the switching action of the working platforms.

1. It isn't environment friendly to use oil hydraulic devices: oil in oil hydraulic devices is prone to pollute the environment, and difficult to dispose of, and oil hydraulic devices consume electric power, and have to be maintained regularly. And, the oil containers occupy much space.

SUMMARY OF THE INVENTION

It is a main object of the invention to provide an improvement on a fixing mechanism of a lathe, which prevents switching action of the working platforms from being interfered with, and allows a moving shaft thereof to move a shorter distance in securing/releasing the working platforms, thus increasing efficiency of the lathe and safety of operation.

The fixing mechanism of the present invention includes a stock, a moving shaft, a power source, gripping bars, and a working platform. The stock has a shaft seat secured therein, which has a hollow holding portion, and a protruding portion on an inner side of the hollow holding portion. The moving shaft is passed in the shaft seat in an up and down movable manner, and has a head projecting into the holding space of the stock. The power source is connected to the moving shaft for actuating the moving shaft. The gripping bars are spaced around the shaft head in the holding space, and each have an inner recess, and an outer recess. The working platform has a hollow portion, and an inwardly protruding portion, which will be right above and face the protruding portion of the shaft seat when the working platform is placed on the shaft seat. When the moving shaft is moved upwards, the first step-shaped portion will be pressed against upper edges of the inner recesses of the gripping bars to raise the gripping bars; thus, both the protruding portions together are tightly held within the outer recesses of the gripping bars, thus securing the working platform to the stock. When the moving shaft is moved down, the gripping bars will release the working platform.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
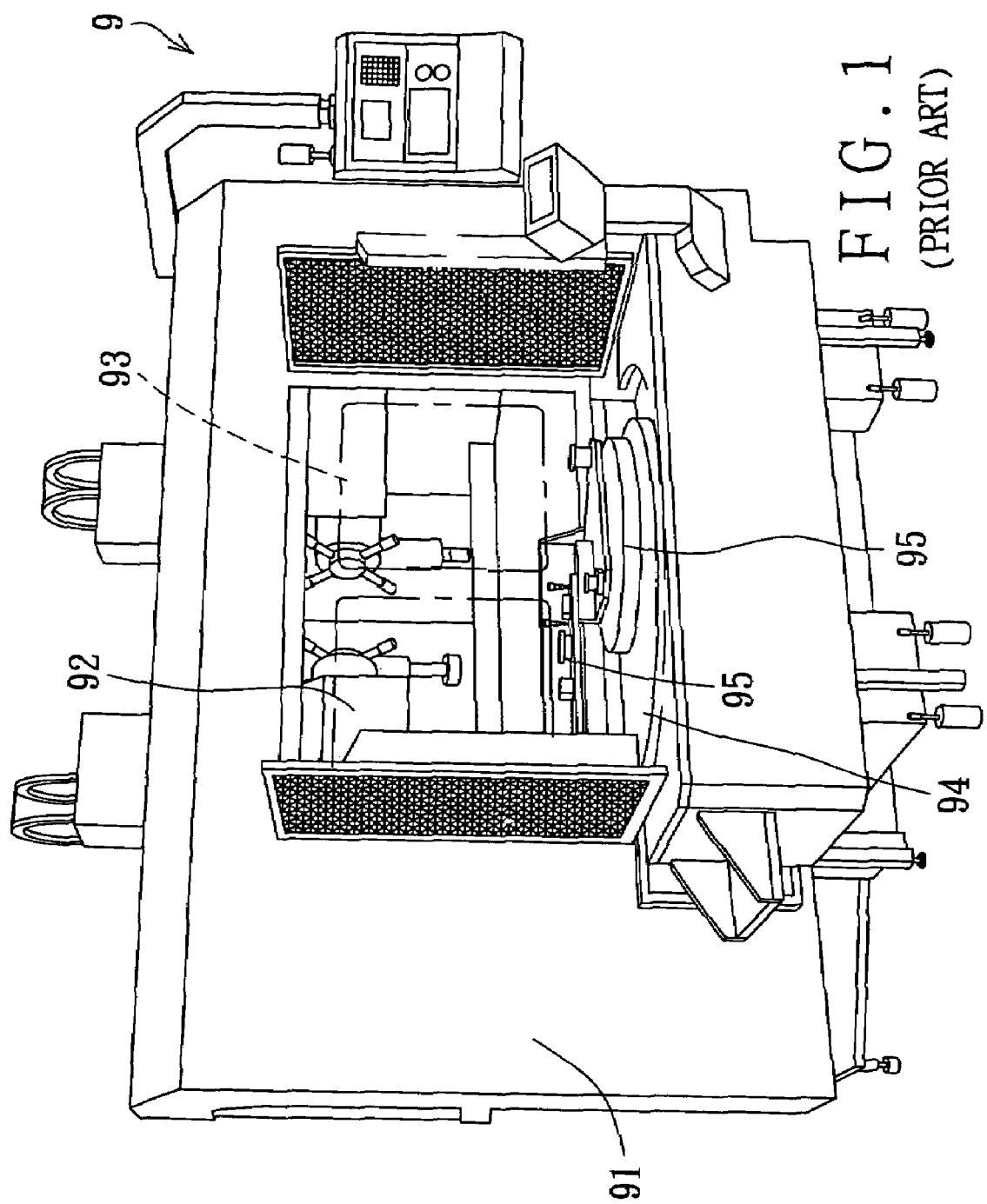
FIG. 1 is a view of the currently existing lathe.
Figure 2:
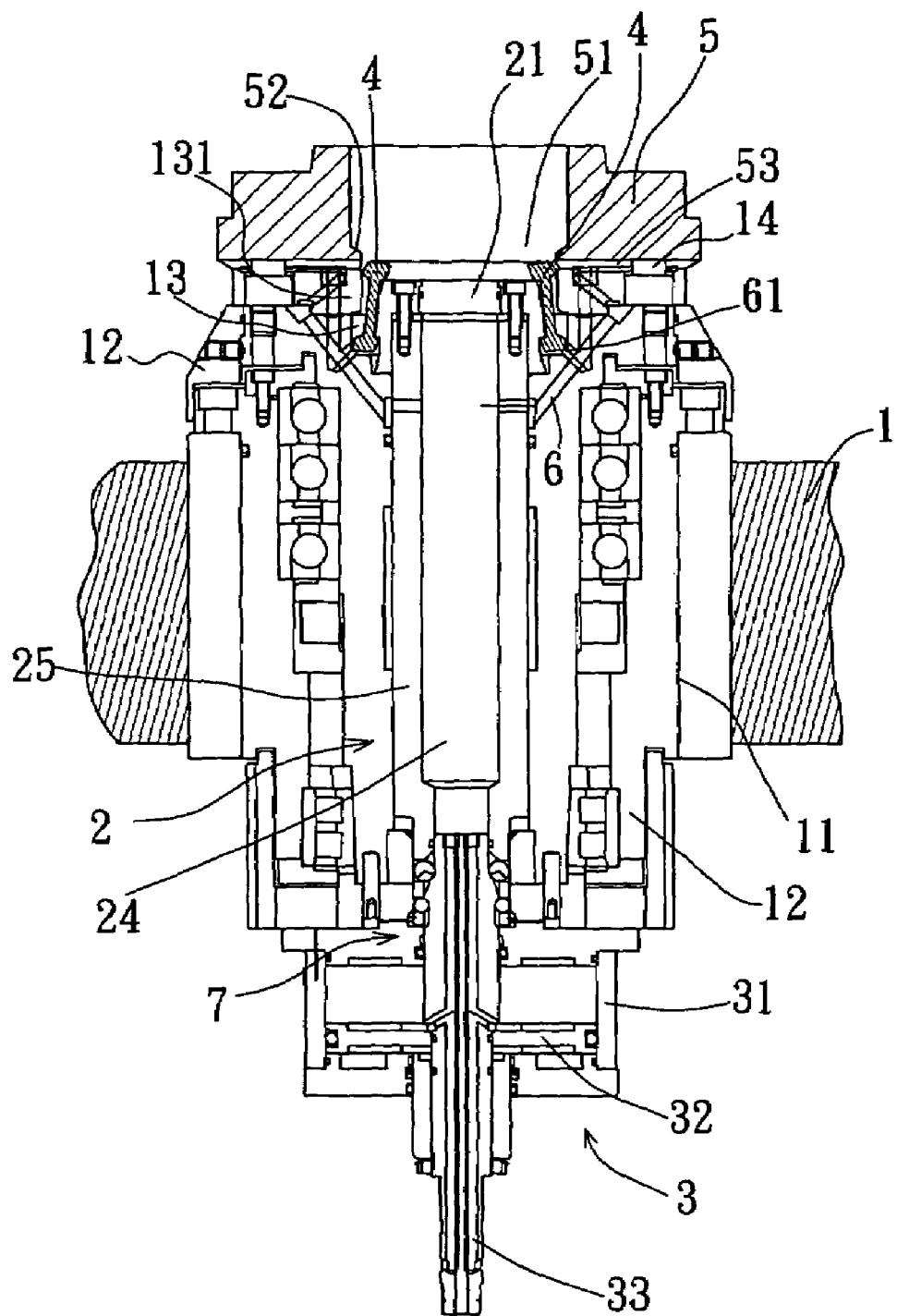
FIG. 2 is a sectional view of the present invention with the moving shaft being lowered, and the working platform being released.
Figure 3:
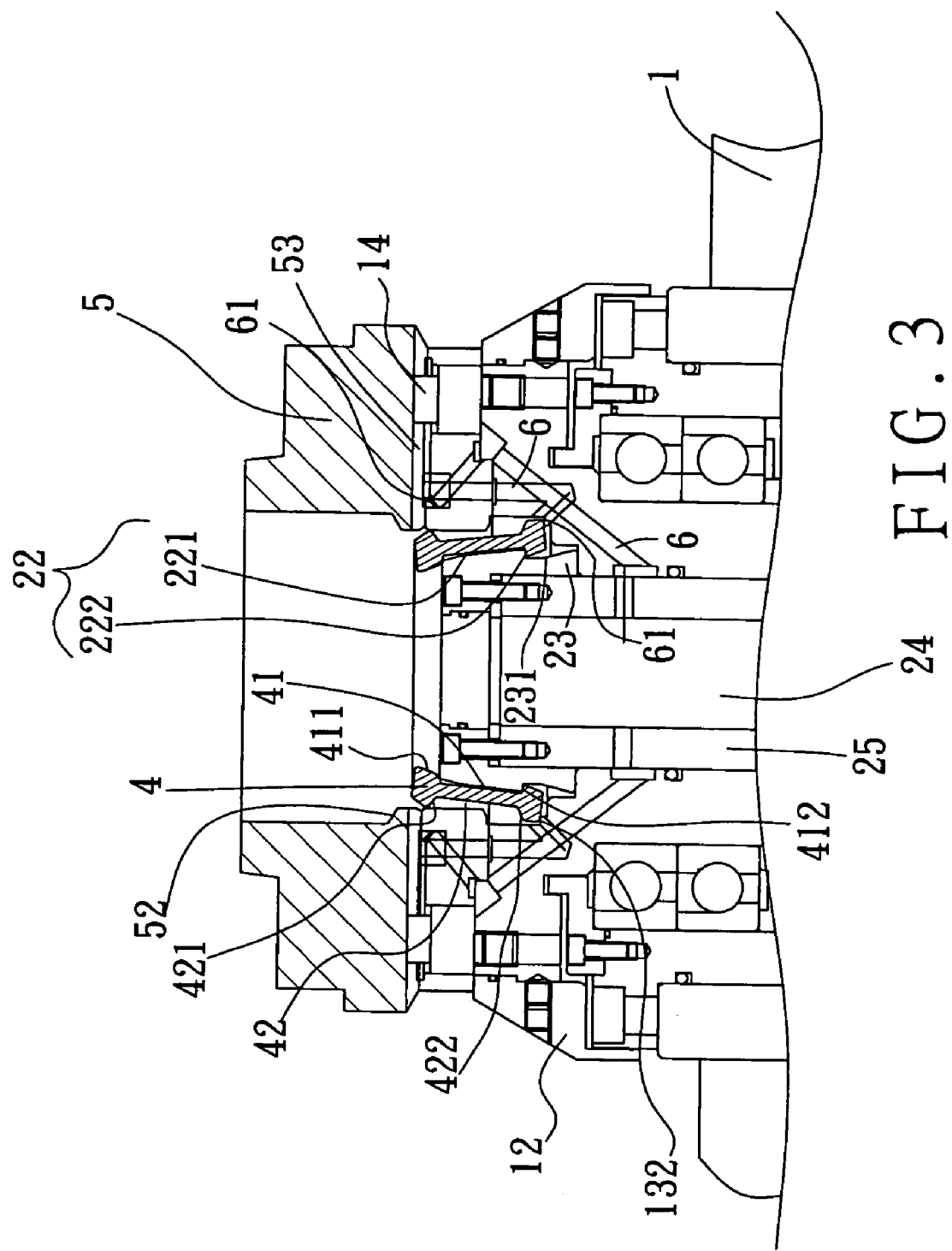
FIG. 3 is an enlarged view of FIG. 2.
Figure 4:
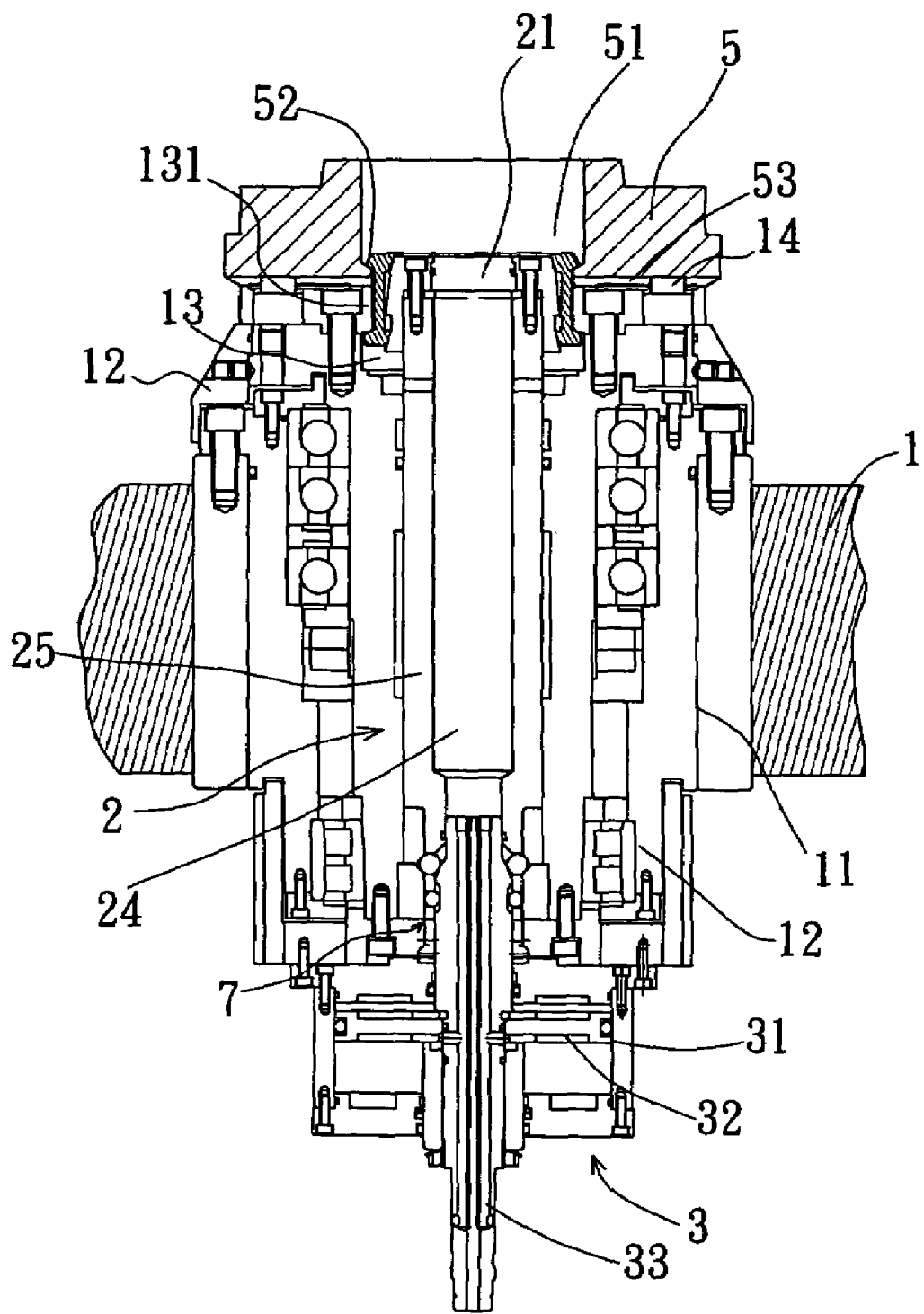
FIG. 4 is a sectional view of the present invention with the moving shaft being raised, and the working platform being fixed to the shaft seat.
Figure 5:
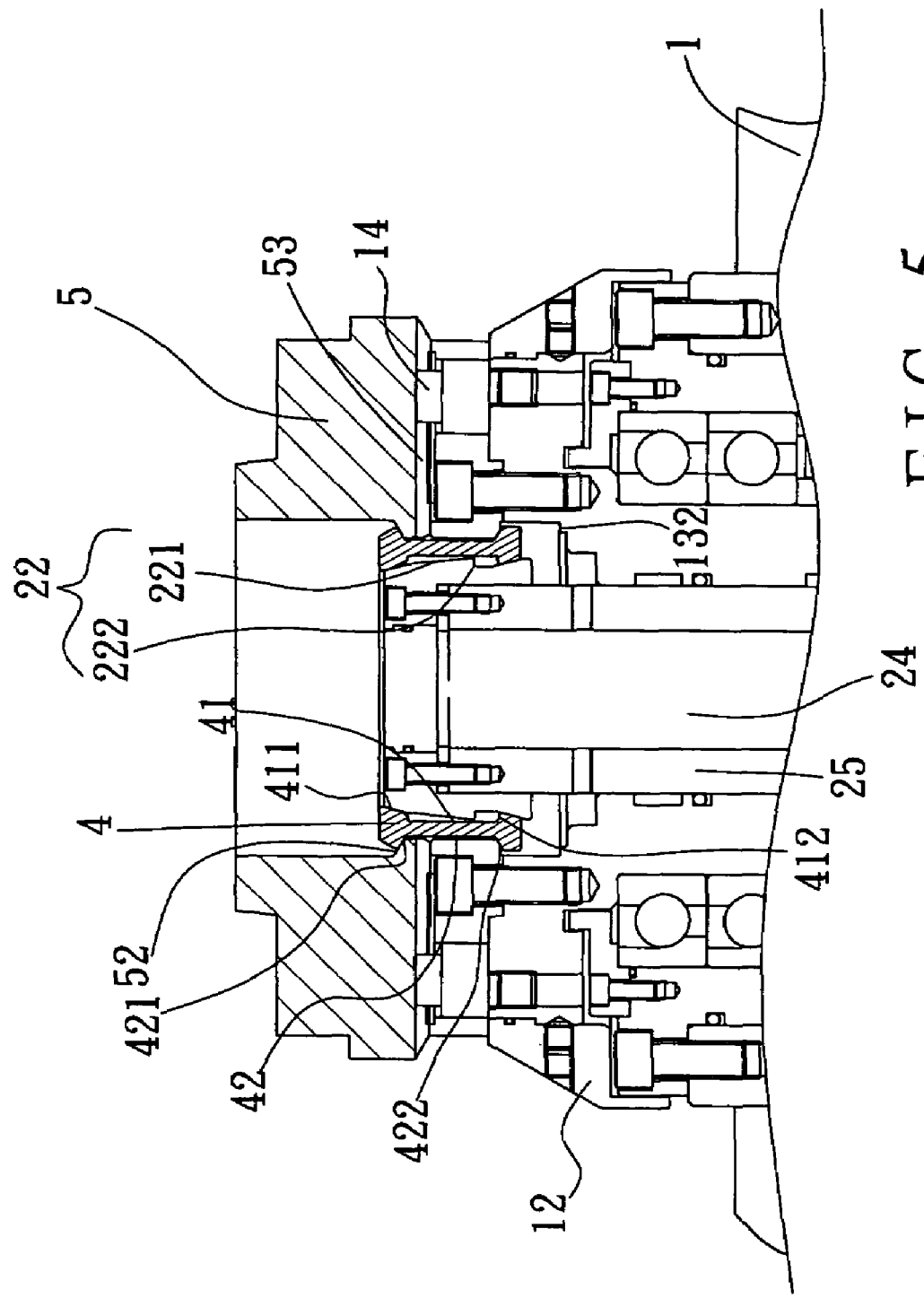
FIG. 5 is an enlarged view of FIG. 4.
Figure 6:
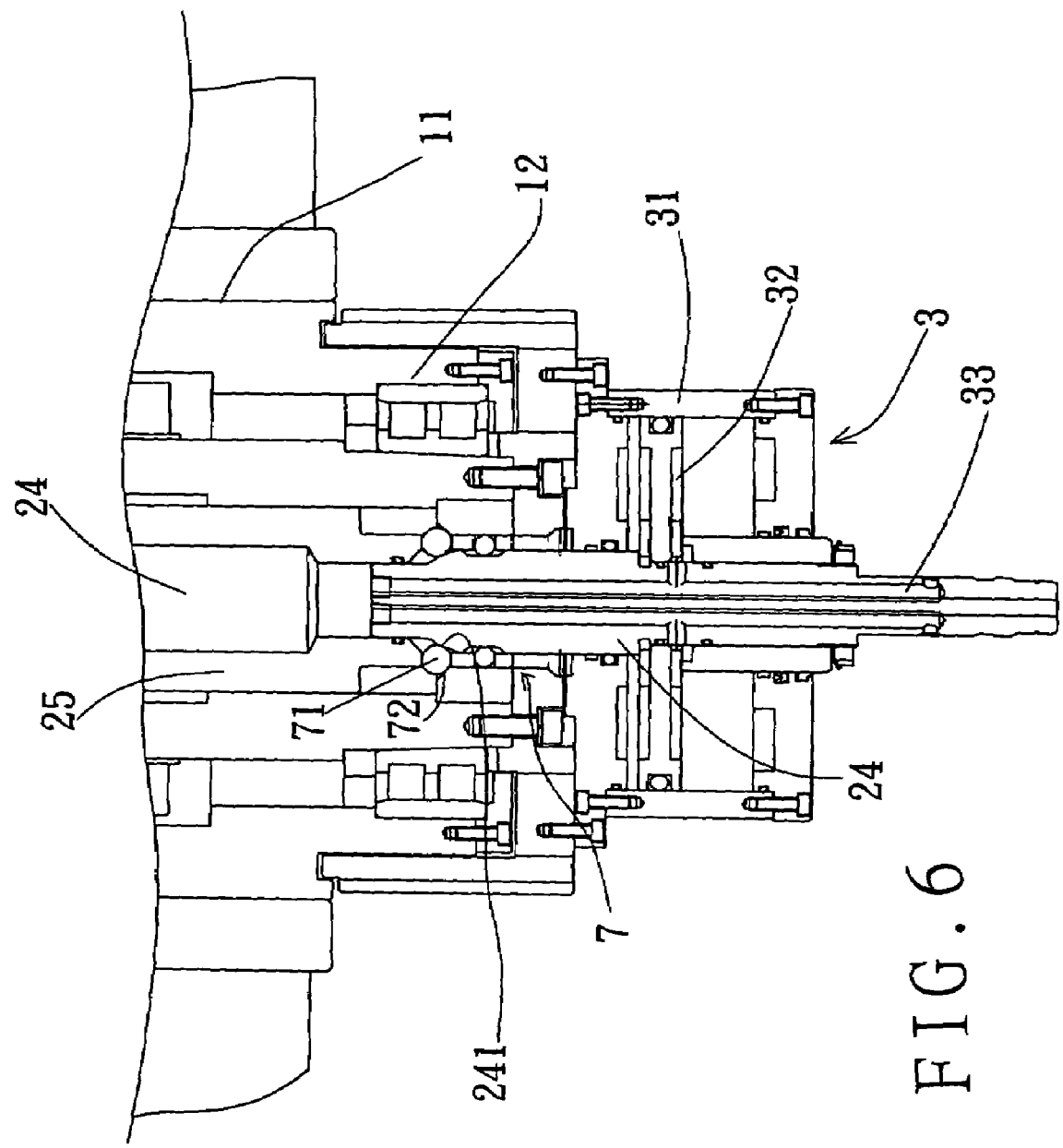
FIG. 6 is an enlarged partial view of the force multiplying structure in the present invention.

Referring to FIGS. 2 to 6, a preferred embodiment of a fixing mechanism of a lathe includes:

a stock 1, the stock 1 has a through hole 11, and a shaft seat 12 secured in the through hole 11; the shaft seat 12 has a hollow holding portion 13 at one end, a protruding portion 131 on an inner side of the hollow holding portion 13, and a step 132 in a lower section of the hollow holding portion 13;

a moving shaft 2, the moving shaft 2 is passed in the shaft seat 12 in an up and down movable manner; the moving shaft 2 has a shaft head 21 at one end, which projects into the hollow holding portion 13 of the shaft seat 12 of the stock 1; the shaft head 21 has first and second step-shaped portions 22 and 23; the first step-shaped portion 22 has a peg-like cross-section, and has a pushing side 221, and a lower pulling side 222; the second step-shaped portion 23 has a cross-section like a triangle cone, and it has a propping side 231;

a power source 3, the power source 3 is connected to the moving shaft 2 for causing upward and downward motion of the moving shaft 2; the power source 3 is secured under the stock 1, and it includes a piston cylinder 31, and a piston 32; the piston cylinder 31 is fixed under the shaft seat 12; the piston 32 is securely joined to the moving shaft 2, and received in the piston cylinder 31 in an up and down movable manner; the moving shaft 2 has several air passage 33, through which compressed air can be forced into the piston cylinder 31 for moving the piston 32 up and down; the power source 3 can be other kinds of apparatuses such as oil hydraulic ones, and springs; arrangement of the air passages 33 isn't the subject in the present invention therefore it won't be detailed hereinafter;

several gripping bars 4, the gripping bars 4 are spaced around the shaft head 21 of the moving shaft 2 in the hollow holding portion 13 of the shaft seat 12; each of the gripping bars 4 has an inner recess 41 on an inward side, an outer recess 42 on an outward side; each inner recess 41 has an upper inner side 411 on an upper section, and a lower inner side 412 on a lower section thereof; each outer recess 42 has an upper gripping side 421 on an upper section, and a lower gripping side 422 on a lower section thereof; the shaft seat 12 and the hollow holding portion 13 further have blowing air passages 6, and air-blowing openings 61 of the blowing air passages 6 are respectively formed on the shaft head 21 and in the hollow holding portion 13 such that air can be blown into the working platform 5 and the hollow holding portion 13 for removing unwanted things; and a working platform 5, the working platform 5 has a hollow portion 51, and an inwardly protruding portion 52 at a lower end thereof; when the working platform 5 is placed on the shaft seat 12, the hollow portion 51 will face the hollow holding portion 13 of the shaft seat 12, and the inwardly protruding portion 52 and the protruding portion 131 will be on a same vertical plane at the inward ends thereof.

Furthermore, the moving shaft 2 has a force multiplying structure 7 for increasing the upward pushing force of the piston 32. The force multiplying structure 7 includes a piston rod 24, a shaft sleeve 25, rolling beads 71, and a sloping side 72 formed on an inner side of the shaft seat 12. The piston rod 24 is received in the moving shaft 2, and it has a circumferential sloping side 241. The shaft sleeve 25 is securely joined to the shaft head 21 at an upper end thereof, and positioned around movable relative to the piston rod 24. The rolling beads 71 are pressed against a lower end of the shaft sleeve 25, and between the sloping side 241 of the piston rod 24 and the sloping side 72 of the shaft seat 12. When the piston rod 24 is moved up, it will push the rolling beads 71 to cause upward motion of the shaft sleeve 25 and the shaft head 12 such that the shaft head 12 is pressed against the gripping bars 4 with a greater force.

The working platform 5 has locating grooves 53 on a bottom thereof, which have the shape of a cross, and are arranged in a radial pattern. And, the shaft seat 12 has locating blocks 14 on an upper side thereof, which are to be fitted on the locating grooves 53 for making the working platform 5 located exactly in the correct position.

To fix the working platform 5, first the working platform 5 is accurately positioned on the shaft seat 12, and next the moving shaft 2 is moved upwards with the pushing side 221 of the first step-shaped portion 22 of the shaft head 21 being pressed against the upper edges (the upper inner side 411) of the inner recesses 41 of the gripping bars 4 so as to raise the gripping bars 4. When the gripping bars 4 are moved up to their extreme position, the inwardly protruding portion 52 of the working platform 5 and the protruding portion 131 of the shaft seat 12 together will be tightly held within the outer recesses 42 of the gripping bars 4; more detailedly, the upper gripping sides 421 of the outer recesses 42 thereof will be closely pressed against the protruding portion 52 of the working platform 5, and the lower gripping sides 422 of the outer recesses 42 closely pressed against the protruding portion 131 of the shaft seat 12. Consequently, the working platform 5 is firmly secured to the stock 1. At the same time, the propping side 231 of the second step-shaped portion 23 of the shaft head 21 will be pressed against lateral sides of the gripping bars 4, and help increase tightness of connection between the working platform 5 and the shaft seat 12 together with the pushing side 221 of the first step-shaped portion 22.

To release the working platform 5 from the shaft seat 12, first the moving shaft 2 is moved downwards such that the lower pulling side 222 of the first step-shaped portion 22 of the shaft head 21 is pressed against the lower inner sides 412 of the inner recesses 41, and pulls the gripping bars 4 downwards; thus, the outer recesses 42 of the gripping bars 4 are separated from the protruding portions 52, 131 of the working platform 5 and the shaft seat 12. While the gripping bars 4 are moving down, the gripping bars 4 will be pressed against the step 132 of the shaft seat 12 at lower ends thereof, and next the first step-shaped portion 22 of the shaft head 21 pressed against the inner sides of the gripping bars 4 to tilt the gripping bars towards the shaft head 21. Consequently, the working platform 5 is released, and becomes capable of being rotated.

The present invention is illustrated by the above example, but its application shouldn't be limited to vertical lathes or the spindle parts of lathes.

From the above description, it can be seen that the fixing mechanism of the present invention has the following advantages over the conventional one:

1. The gripping bars of the fixing mechanism hide instead of sticking out: the gripping bars are moved inwardly to release the working platforms therefore the switching action of the working platforms can't be interfered with. Consequently, the working platforms only have to move a relatively short distance in switching, and it takes less time to switch the working platforms, and the lathe can be operated more safely.

2. The present invention is environment friendly and easy to maintain: compressed air is used as the power to actuate the fixing mechanism, eliminating the need to use an oil hydraulic device, which has to be maintained regularly, and contains oil prone to pollute the environment, and difficult to dispose of. And, the fixing mechanism has the force multiplying structure for making the working platform secured and released more easily.

3. The fixing mechanism is easy to clean and the working platform will be accurately located: the blowing air passages are hidden within the shaft seat so as not to spoil the appearance of the fixing mechanism; air can be blown through the blowing air passages to clean the working platform and the hollow holding portion of the shaft seat; the working platform has locating grooves on a bottom thereof, and the shaft seat has locating blocks on an upper side thereof, which are fitted on the locating grooves for making the working platform accurately located.

What is claimed is:

1. A fixing mechanism of a lathe, comprising a stock, the stock having a through hole, and a shaft seat secured in the through hole; the shaft seat having a hollow holding portion in one end thereof, and a protruding portion on an inner side of the hollow holding portion;

a moving shaft passed in the shaft seat in an up and down movable manner; the moving shaft having a shaft head at one end, which projects into the hollow holding portion of the shaft seat of the stock; the shaft head having a first step-shaped portion;

a power source connected to the moving shaft for causing upward and downward motion of the moving shaft;

a plurality of gripping bars, the gripping bars being spaced around the shaft head of the moving shaft in the hollow holding portion of the shaft seat; each of the gripping bars having an inner recess on one side, and an outer recess on other side; and a working platform, the working platform having a hollow portion at a lower end thereof; the working platform having an inwardly protruding portion; the hollow portion of the working platform being going to face the hollow holding portion of the shaft seat when the working platform is placed on the shaft seat;

whereby when the working platform is placed on the shaft seat, and the moving shaft is moved upwards, the first step-shaped portion of the shaft head will be pressed against upper edges of the inner recesses of the gripping bars to raise the gripping bars, and in turn the inwardly protruding portion of the working platform and the protruding portion of the shaft seat together are tightly held within the outer recesses of the gripping bars, thus securing the working platform to the stock.

2. The fixing mechanism of a lathe as recited in claim 1, wherein the power source includes a piston cylinder, and a piston; the piston cylinder being fixed under the shaft seat; the piston being securely joined to the moving shaft, and received in the piston cylinder in an up and down movable manner.

3. The fixing mechanism of a lathe as recited in claim 2, wherein there are a plurality of air passages communicating with the piston cylinder; compressed air being forced into the piston cylinder through the air passages for moving the piston up and down.

4. The fixing mechanism of a lathe as recited in claim 1, wherein the moving shaft has a force multiplying structure for increasing an upward pushing force of the piston; he force multiplying structure including a piston rod, a shaft sleeve, a plurality of rolling beads, and a sloping side formed on an inner side of the shaft seat; the piston rod being received in the moving shaft; the piston rod having a circumferential sloping side; the shaft sleeve being securely joined to the shaft head at an upper end thereof, and positioned around and movable relative to the piston rod; the rolling beads being pressed against a lower end of the shaft sleeve, and between the sloping side of the piston rod 24 and the sloping side of the shaft seat; when the piston rod is moved up, it will push the rolling beads to cause upward motion of the shaft sleeve and the shaft head such that the shaft head is pressed against the gripping bars with increased force.

5. The fixing mechanism of a lathe as recited in claim 1, wherein the shaft head further has a second step-shaped portion; the second step-shaped portion having a propping side; when the shaft head moves the gripping bars for the gripping bars to hold the shaft seat and the working platform together, the propping side of the second step-shaped portion being going to be pressed against lateral sides of the gripping bars to help increase tightness of connection between the working platform and the shaft seat.

6. The fixing mechanism of a lathe as recited in claim 1, wherein the shaft seat further has a step in a lower section of the hollow holding portion thereof; while the gripping bars are moving down, the gripping bars being going to be pressed against the step of the shaft seat at lower ends thereof, and the first step-shaped portion of the shaft head pressed against the gripping bars to tilt the gripping bars towards the shaft head.

7. The fixing mechanism of a lathe as recited in claim 1, wherein the shaft seat and the hollow holding portion further have a plurality of blowing air passages for air to be blown through to clean the working platform and the hollow holding portion.

8. The fixing mechanism of a lathe as recited in claim 1, wherein the working platform has a plurality of locating grooves on a bottom thereof, and the shaft seat has a plurality of locating blocks on an upper side thereof; the locating blocks being fitted on the locating grooves for making the working platform accurately located.

* * * * *